(12) United States Patent
Schlesinger et al.

(10) Patent No.: US 8,914,230 B2
(45) Date of Patent: Dec. 16, 2014

(54) REALTIME SOCIALLY-DERIVED AND SHARED TIME-OF-ARRIVAL ESTIMATION TO A DESTINATION

(75) Inventors: Benny Schlesinger, Ramat Hasharon (IL); Shira Weinberg, Tel Aviv (IL)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/489,480

(22) Filed: Jun. 6, 2012

(65) Prior Publication Data

US 2013/0332067 A1    Dec. 12, 2013

(51) Int. Cl.
*G01C 21/34* (2006.01)
(52) U.S. Cl.
USPC ............ 701/422; 701/533; 701/410; 701/465
(58) Field of Classification Search
USPC .......................................... 701/422, 533, 410
See application file for complete search history.

(56) References Cited

U.S. PATENT DOCUMENTS

| | | | |
|---|---|---|---|
| 8,296,050 B2* | 10/2012 | Tomizawa | 340/988 |
| 2003/0100326 A1 | 5/2003 | Grube et al. | |
| 2004/0158401 A1 | 8/2004 | Yoon | |
| 2008/0312822 A1 | 12/2008 | Lucas et al. | |
| 2009/0112467 A1 | 4/2009 | Jiang et al. | |
| 2009/0170538 A1 | 7/2009 | Shrivathsan et al. | |
| 2011/0093188 A1 | 4/2011 | Barkai et al. | |
| 2012/0010807 A1 | 1/2012 | Zhou | |

OTHER PUBLICATIONS

"A Method for Social Collaborative Navigation in a Dynamic Environment", Mar. 12, 2012, IP.com Prior Art Database Technical Disclosure.*
Tang, et al., "Rethinking Location Sharing: Exploring the Implications of Social-Driven vs. Purpose-Driven Location Sharing", Retrieved at http://www.cs.cmu.edu/~jasonh/publications/ubicomp2010-socialsharing-final.pdf>>, Proceedings of Ubicomp '10 Proceedings of the 12th ACM international conference on Ubiquitous computing, Sep. 26-29, 2010.
Kincaid, Jason, "Glympse Brings Real-Time Location Sharing to Facebook", Retrieved at <<http://techcrunch.com/2010/04/15/glympse-brings-real-time-location-sharing-to-facebook/>>, Apr. 15, 2010.

* cited by examiner

*Primary Examiner* — Mary Cheung
*Assistant Examiner* — Brian P Sweeney
(74) *Attorney, Agent, or Firm* — Steve Spellman; Jim Ross; Micky Minhas

(57) ABSTRACT

Architecture that enables shared social selection by multiple participants of a route (or routes) to a physical destination based at least in part on estimated time-of-arrival (ETA) of the participants to the destination as a group, and joint selection of the destination as a group. The individuals of the group may travel from different locations and along same or different routes to the destination. The architecture assists in planning shared (and/or separate) routes to the destination and estimating the time the group as a whole will be together at the destination. The ETA for the group can be based on the person of the group estimated to arrive at the destination last in time. Interaction capabilities (e.g., texting) are facilitated between group members as part of the navigation system, and dynamic destination decisions can be based on user locations, calculated routes, and/or the type of destination.

13 Claims, 8 Drawing Sheets

REALTIME SOCIALLY-DERIVED AND SHARED TIME-OF-ARRIVAL ESTIMATION TO A DESTINATION

BACKGROUND

When people want to meet at a physical location, the meeting place and time to the location typically need to be coordinated based on the current physical location of each person, possible routes by each person to the meeting, and travel conditions (e.g., traffic) related to each of the possible routes. Currently, this coordination effort is typically performed using communications devices such as cell phones, which lack the software tools for efficient planning and communication for such purposes. Furthermore, the conditions under which the meeting is planned can change dynamically thereby requiring frequent (e.g., continuous) updates of the associated data to derive the estimated time-of-arrival of the participating people, based on route and destination, for example.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the sharing and social selection by multiple entities (e.g., users) of a route (or routes) to a physical geographical destination based at least in part on estimated time-of-arrival (ETA) of the entities to the destination. The ETA information (e.g., at 12:15 PM) is also shared among the entities. Additionally, the entities, as a group, can jointly select the destination or a new destination. The architecture computes the ETA of each entity of the group travelling to the destination from different corresponding locations to assist in planning shared (and/or separate) routes to the destination.

The architecture facilitates location sharing and ETA sharing by way of interactive communications capabilities (e.g., texting, chat, destination selection, etc.) provided for communications between the entities (users), and optionally, as a part of a navigation system. Destination decisions can be made dynamically based on user locations of the group of users and calculated routes, and can be made dynamically based on user locations of the group of users and the type (or category) of destination defined by the users.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
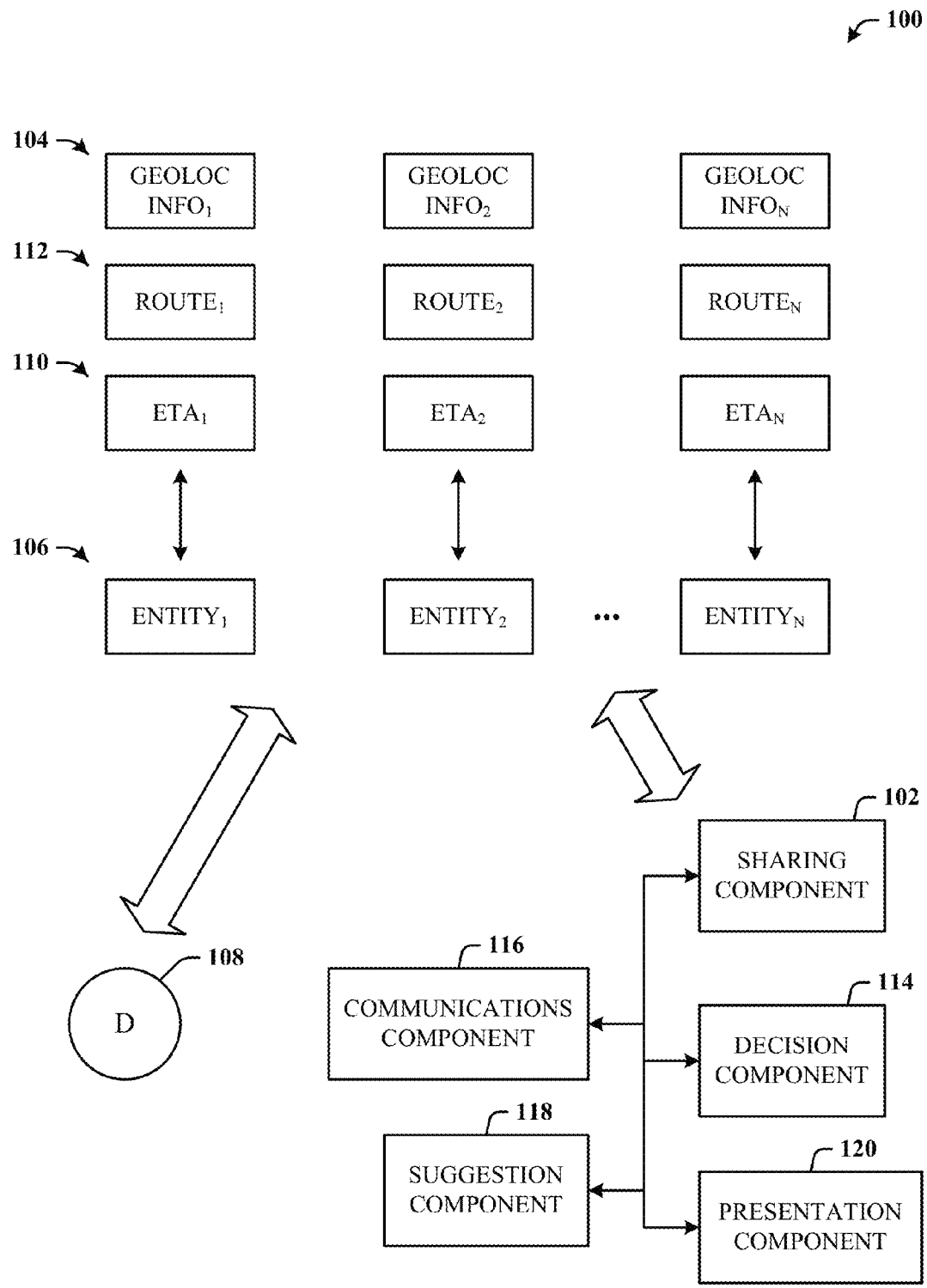
FIG. 1 illustrates a system in accordance with the disclosed architecture.

The disclosed architecture enables the sharing of geolocation information of multiple users and estimated time-of-arrival (ETA) information (e.g., "noon", rather than "in thirty minutes") of the users to a destination, for viewing by the users. This capability can be provided as a standalone system or in combination with a navigation system. In support thereof, one or more client-side applications are employed on mobile devices, for example, which enable communicative interaction between the users (social) on a route (or routes) to a geographical destination based at least in part on the ETA of the users to the destination as a group, and joint selection of the destination (as a group).

The members of the group may travel from different locations and along same or different routes to the destination. The architecture assists in planning a shared or collaborative way to travel on the same and/or separate routes to the destination and estimating the time each member of the group, as a whole, will be at the destination. The interaction capabilities (e.g., texting) can be facilitated between group users as part of a navigation system, and destination decisions can be made dynamically based on user locations, calculated routes, and/or the type of destination, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes a sharing component 102 that enables sharing of geolocation information (GEOLOC INFO$_{1-N}$) 104 of entities (ENTITY$_{1-N}$) 106 relative to a destination (D) 108 and estimated time-of-arrival (ETA) information (ETA$_{1-N}$) 110 of the entities 106 relative to the destination 108 to identify routes (ROUTES$_{1-N}$) 112 of travel of the entities 106 to the destination 108.

The ETA information 110 can be computed based on a predetermined route derived from the user location to the destination. Alternatively, the ETA information 110 can be computed based on a straight-line distance from a user to the destination 108, at any point in time. As a baseline computation, a navigation system (e.g., global positioning system (GPS)) (not shown) that interfaces to the system 100 can determine the routes and distances (e.g., miles, kilometers, etc.) along the routes to the destination 108, using the navigation system mapping and route computation subsystem. The system 100 can then compute a speed according to the route taken to derive the ETA information. For example, if the route includes a street and a highway, the average speed on the street can be preconfigured to thirty-five miles per hour, and the speed for the highway can be preconfigured to sixty miles per hour. The ETA for this aggregate route can then be computed based on the baseline computation.

However, it is likely that there are many other factors to consider when traveling the route to the destination, such as weather conditions, construction, traffic slow-downs, accidents, etc. This additional information can be obtained from websites or other sources that provide this specific information. For example, in order to consider these additional factors, the system 100 can access a traffic monitoring source (e.g., website) to consider traffic conditions for the specific route. The traffic conditions can vary based on the time of day and day of the week (e.g., rush hour, weekend, etc.).

Similarly, the system 100 can access a weather source to determine road conditions (and hence, vehicle speed) based on the presence of weather conditions such as snow, rain, sleet, etc. Furthermore, the system 100 can access a network data source that provides information related to road construction, such that vehicle speed due to the construction can be considered in the ETA computation. These are just a few examples of the many different types of data sources that can be further considered in the computation of ETA to the destination by a given entity and along a certain route.

The geolocation information 104 can be obtained from a geolocation framework such as GPS, a triangulation system that calculates the approximate geographic location of the user (user device), and so on. The entities 106 can be users associated with mobile devices (e.g., cell phones, mobile-capable tablets or computers, etc.). The devices can include handheld and portable devices (e.g., cell phone, GPS device, portable computer, tablet, etc.), vehicle mounted subsystems as part of a vehicle entertainment/communications system (e.g., Internet, WiFi, etc.), and so on. The sharing capability is enabled among the entities 106.

The geolocation information 104 and ETA information 110 can be updated automatically as the entities 106 travel to the destination 108, if the computed route and conditions change. In other words, as the user travels along a route (e.g., streets, highways, avenues, walking/hiking pathway, etc.), the distance from the user to the destination typically will decrease. However, the ETA information will remain the same. It can be the case that the ETA associated with a user travelling a specific route can increase due to unforeseen (not considered in the original computation) conditions (e.g., construction, accident, slow-downs, weather conditions, etc.) and/or due to the user, such as for a breakdown of the user mode of transportation. It can also be the case that the ETA of a given user can decrease, increase, or remain the same, based on a recomputed new route. For example, if during travel to the destination 108, the original route (and associated ETA) is determined to be unusable, the associated ETA for the original route can be updated based on a new route computed from the current user location.

The system 100 can further comprise a decision component 114 that enables dynamic decision-making among the entities 106 as part of travel to the destination 108 based on entity location at a given point in time and calculated routes to the destination 108. In other words, as the entities 106 are navigating to the destination 108, the entities 106 can intercommunicate as desired to choose to continue to the destination 108, or decide to change the destination 108 to a different destination. Some of the entities 106 can choose to take different routes, as well; thus, initiating new computations of the corresponding ETA information.

The decision component 114, alternatively or in combination therewith, enables dynamic decision-making among the entities 106 as part of travel to the destination based on entity location at a given point in time and type (also referred to as category) of destination defined by the entities 106. Rather than the destination 108 being identified as Business A, the entities 106 can specify the type of destination as a restaurant, for example, or a music venue. The system 100 can find and present a listing of the destination types (categories) to the entities 106, from which the entities 106 can select a single destination. The ETA information 110 is then computed based on the route selected (and other optional conditions such as weather, construction) by the given entity to the destination 108.

The sharing component 102 interacts with a communications component 116 to enable collaborative interactive communications between the entities 106 associated with navigating to the destination 108, and if desired, suggesting a new destination. The system 100 can further comprise a suggestion component 118 that suggests the new destination suitable to the entities 106. The suggestion can be derived based on user profiles (e.g., a user only prefers a destination in a certain part of town, a user only prefers Italian food, a user prefers only two types of transportation, etc.), past behavior of the users (entities 106) at a given time, day, etc. For example, if data indicates that the entities 106 typically frequent a given destination at this time of day, the suggestion can be to navigate to that destination. In another example, it can be the case that the entities 106 are members of a product team, and the destination is a meeting room, where the system 100 can suggest a meeting room based on the current location of the users in company buildings, commute to work, etc.

The destination 108 can be a predetermined specific destination for which the ETA of the group is computed. In other words, the ETA of the group as a whole can be estimated based on the ETAs of the individual entities 106. The destination 108 can be a category of destination for which the ETA of the group is computed. The sharing component 102 enables an entity to invite another entity to take a same route to the destination.

The system 100 can further comprise a presentation component 120 that enables visual presentation of an entity graphic (e.g., person icon, vehicle, etc.) representative of an entity, ETA information associated with the entity graphic, and destination. In other words, the entity graphic can be car where the associated user is driving a car to the destination, a bus where the associated user is riding a bus to the destination, and a caricature of a person walking where the associated user is walking to the destination 108. The presentation component 120 can operate in cooperation with the display system of the user's mobile device (or the specific device of the user). In other words, the presentation component 120 provides compatible graphics for a navigation system display that shows a map (e.g., streets, avenues, rivers, buildings, etc.), such that users are displayed at their current geographic location on the map, the corresponding ETA information is displayed for each user, and optionally, the route each user may travel (computed) to the destination 108.

Figure 2:
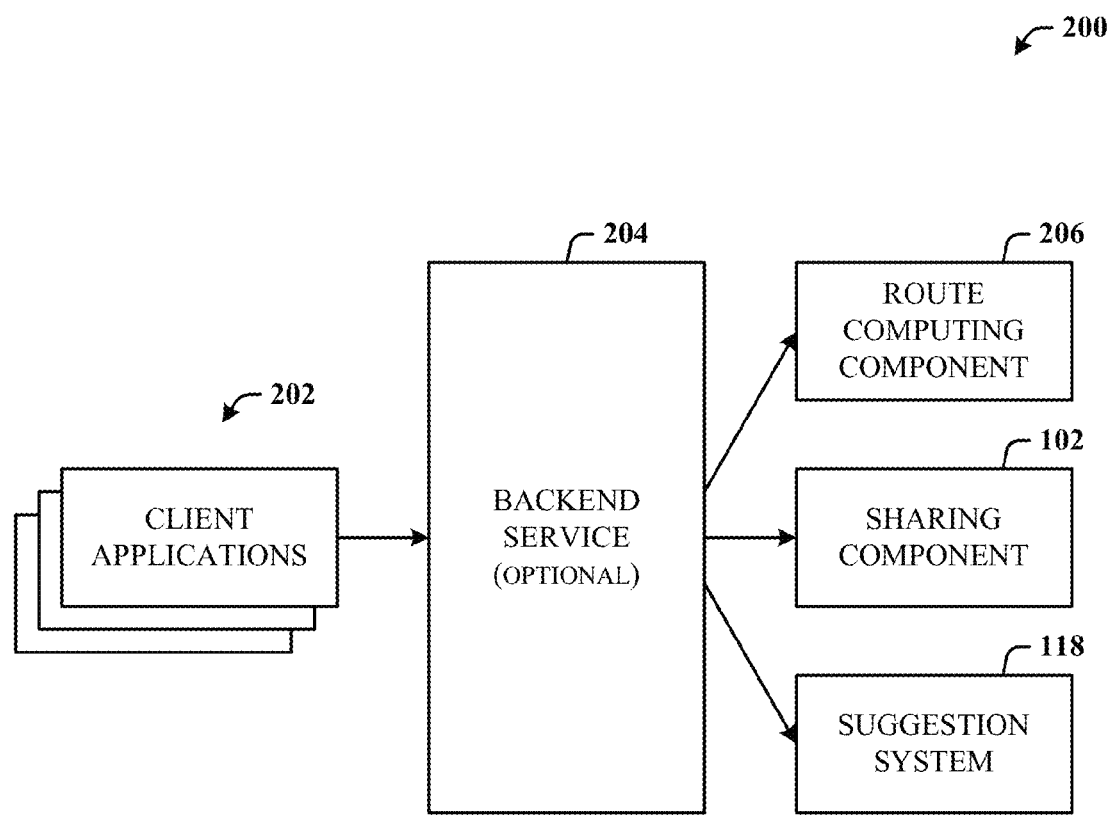
FIG. 2 illustrates an exemplary system architecture that facilitates realtime social time-of-arrival estimation to a destination.

FIG. 2 illustrates an exemplary system architecture 200 that facilitates realtime social time-of-arrival estimation to a destination. The architecture 200 includes the utilization of client-side applications 202 that install on user mobile devices such as cell phones. The applications 202 communicate with an optional backend service 204, which facilitates communications with the suggestion component 118, the sharing component 102 (for at least ETA and location sharing), and a route computing component 206. The route computing component 206 can be a conventional web-based navigation system that determines a route of travel between geographic locations, such as the user's home and a store.

The client applications 202 can utilize capabilities of mobile devices that have a geolocation capabilities (e.g., GPS) and web access (e.g., smartphones, GPS devices, etc.), for example.

The architecture 200, which enables a group of people to organize a meeting, can be employed either as an addition to an existing navigation system or as a standalone system/application. The architecture 200 can provide standard navigation capabilities, and the ability to invite other users (e.g., via texting, email, social communications technologies, etc.) to share a route, destination, and ETA. Thus, all invited users can view each other's location, route, and updated ETA information, as well as updates to the user location, ETA, and route while traveling to the destination 108. Additionally, the architecture 200 enables the group of users to interact to select the most suitable destination based on their associated ETAs, and can auto-suggest suitable destinations.

The disclosed architecture provides capabilities, including but not limited to, routing capabilities based on available routes and traffic data, the dynamic update of user routes and ETA information according to traffic data, location sharing and ETA sharing between a group of users, the proposal by users to different destinations, user interaction such a chat, and destination suggestion based on the group member ETAs and on the type of destination defined by the users.

The disclosed architecture can be applied to a wide range of scenarios, from a basic two-person "pick me up" scenario to group of mobile users planning to meet. In the "pick me up" scenario, the first person is stationary and the second person drives to the first person location. In the group scenario, a few mobile users choose to meet at the same time at the same destination, which can be dynamically determined using the architecture or selected by the users based on the location and ETAs of the group members.

The disclosed architecture can employ a security component for authorized and secure handling of user information. The security component enables an entity (or user) to opt-in and opt-out of making geolocation information available to other users or systems. In other words, other users of a group seeking to meet at the destination may only view the ETA information of the user, as allowed by the user, instead of also the location of the user on a map. It can be the design that only the user can view his/her own user geolocation on the map, whereas other users can only view the user's ETA information.

The security component can ensure the proper collection, storage, and access to the user information while allowing for the dynamic selection and presentation of the content, features, and/or services that assist a richer user experience and access to more relevant information.

Figure 3:
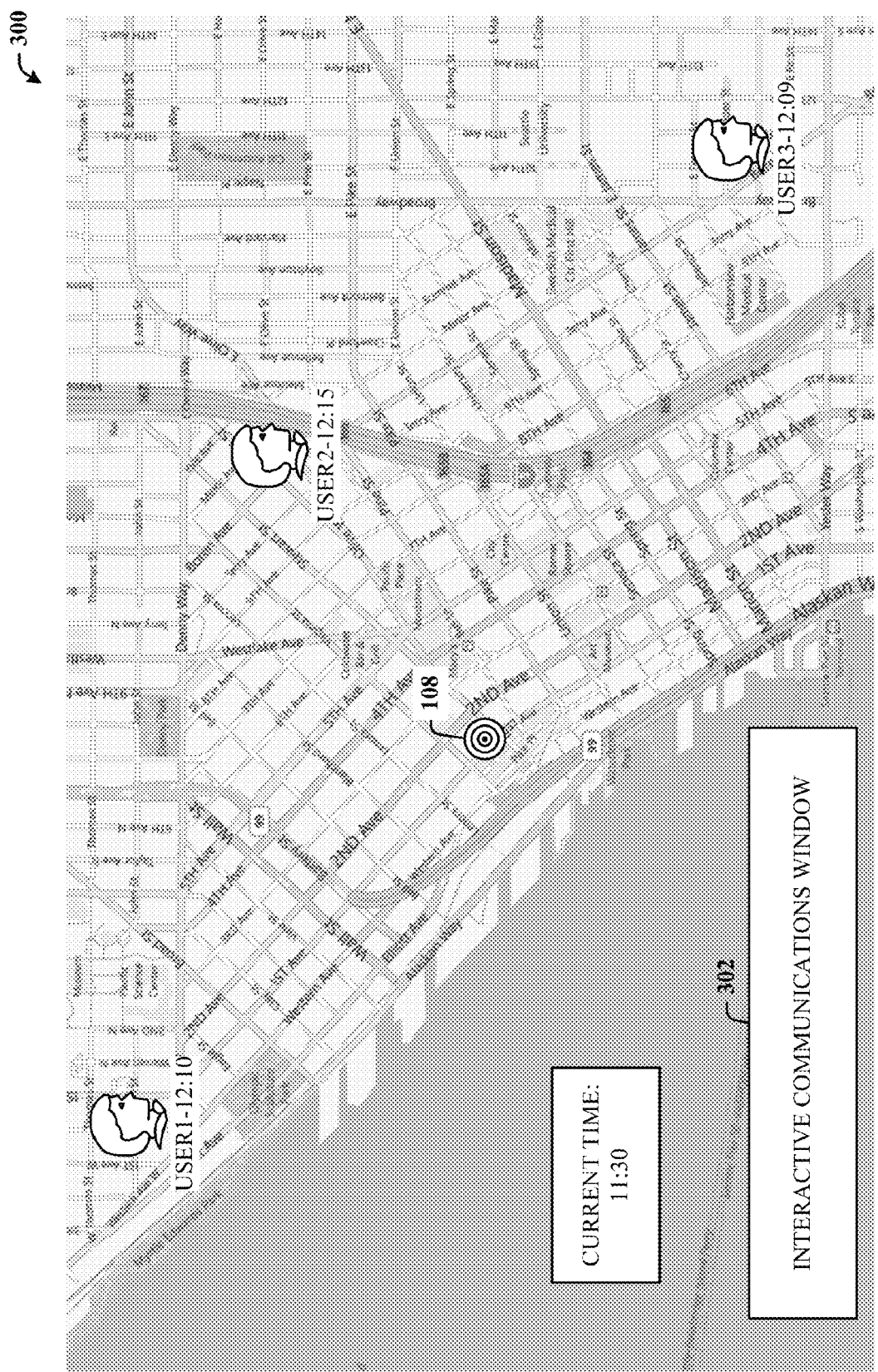
FIG. 3 illustrates a screenshot of an exemplary presentation interface that results when operating in combination with a navigation system.

FIG. 3 illustrates a screenshot of an exemplary presentation interface 300 that results when operating in combination with a navigation system. Here, three users (User1, User2, and User3) are travelling to the destination 108. Each user (User1, User2, and User3) is presented with the interface 300. The ETA information for User1 is the time of 12:10 PM to arrive at the destination 108, the ETA information for User2 is the time of 12:15 PM to arrive at the destination 108, and the ETA information for User3 is the time of 12:09 PM to arrive at the destination 108. The destination 108 can be a French restaurant that matches the business category the users have selected. The interface 300 can also present the current time (e.g., 11:30 PM).

Interactive communications (e.g., messaging, voice call, email, etc.) further enables the users to communicate with one another as they travel to the destination 108. Additionally, the ETA information of the users remains the same as the users get closer to the destination 108. It can be an enhancement to further provide graphical emphasis (e.g., highlight) to the routes shown in the interface 300 that the users are traveling to the destination 108. Should a user (User1) choose to move off the designated (already computed) route, due to any number of reasons (e.g., get gas, street closed, etc.), the ETA information dynamically adjusts and is presented to all users, as well as the new route taken by User1 to the destination 108.

The interface 300 can also include an optional interactive communications window 302 that presents communications information (e.g., chat, text, etc.) from the other users, and enables input of text, for example, to the other users.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
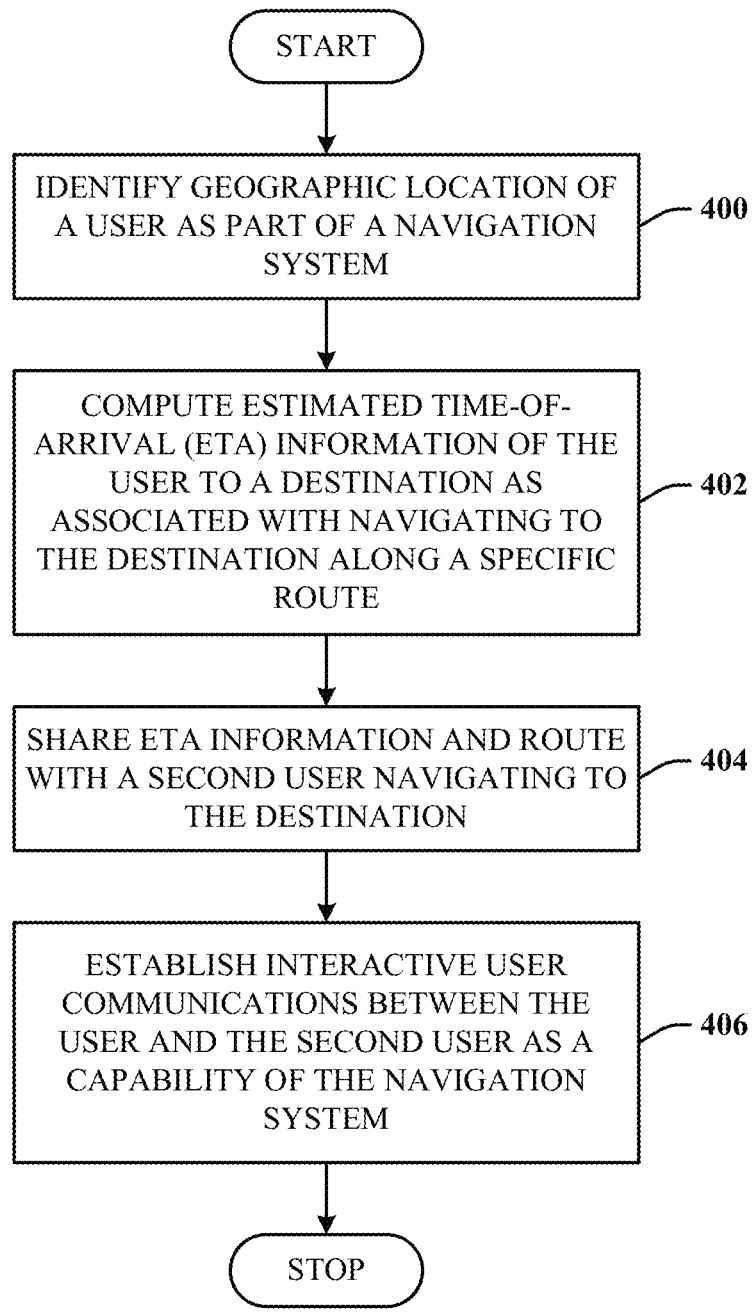
FIG. 4 illustrates a method in accordance with the disclosed architecture.

FIG. 4 illustrates a method in accordance with the disclosed architecture. At 400, geographic location of a user is identified as part of a navigation system. The location can be determined via GPS coordinates, for example. At 402, estimated time-of-arrival (ETA) information of the user to a destination is computed as associated with navigating to the destination along a specific route. At 404, the ETA information and route are shared (and presented) with a second user navigating to the destination. At 406, interactive user communications is established between the user and the second user as a capability of the navigation system. Thus, the two users can communicate while traveling to the destination.

Figure 5:
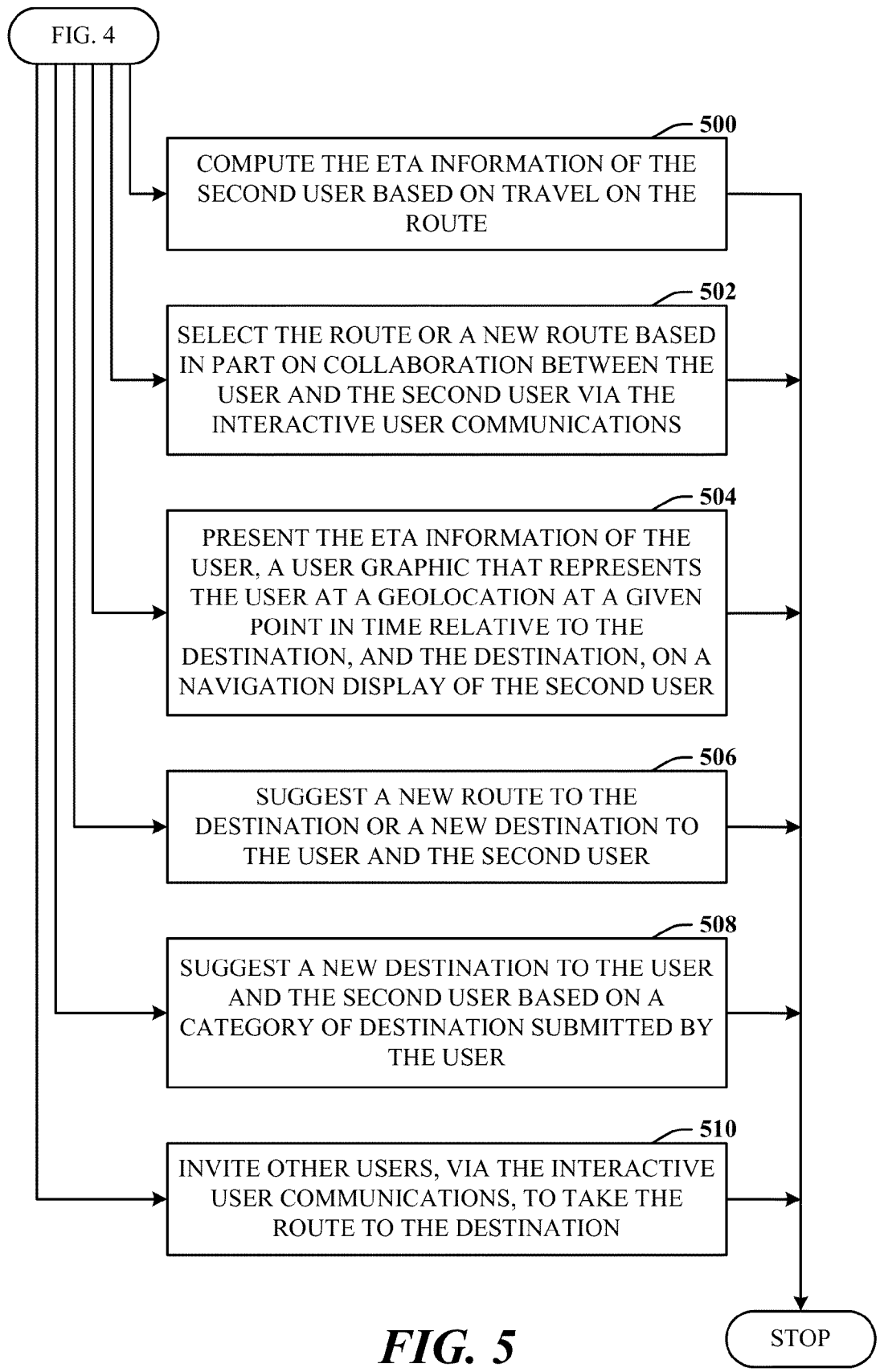
FIG. 5 illustrates further aspects of the method of FIG. 4.

FIG. 5 illustrates further aspects of the method of FIG. 4. Note that the flow indicates that each block can represent a step that can be included, separately or in combination with other blocks, as additional aspects of the method represented by the flow chart of FIG. 4. At 500, the ETA information of the second user is computed based on travel on the route. At 502, the route or a new route is selected based in part on collaboration between the user and the second user via the interactive user communications. At 504, the ETA information of the user, a user graphic that represents the user at a geolocation at a given point in time relative to the destination, and the destination, is presented on a navigation display of the second user. At 506, a new route to the destination or a new destination is suggested to the user and the second user. At 508, a new destination is suggested to the user and the second user based on a category of destination submitted by the user. At 510, other users are invited, via the interactive user communications, to take the route to the destination.

Figure 6:
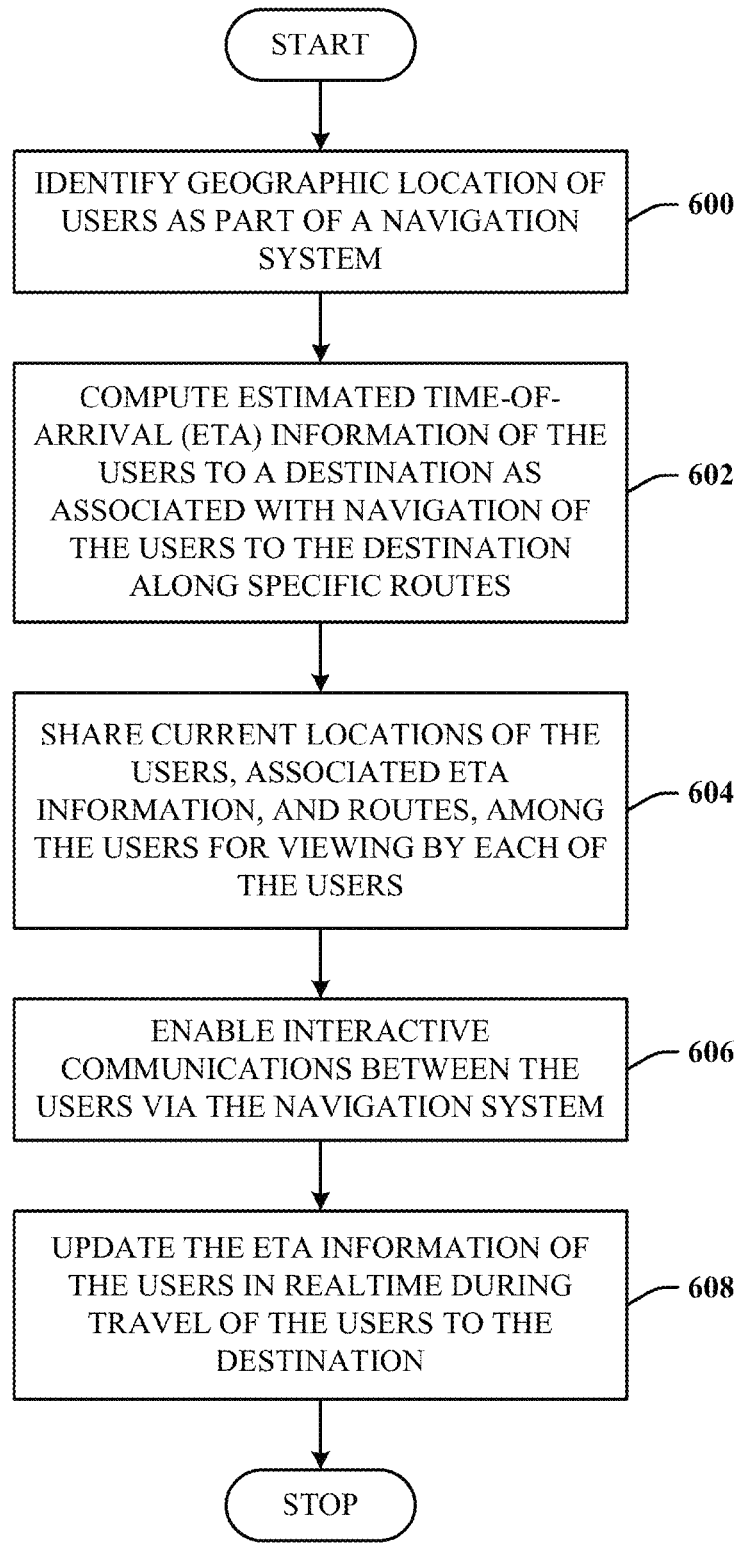
FIG. 6 illustrates an alternative method in accordance with the disclosed architecture.

FIG. 6 illustrates an alternative method in accordance with the disclosed architecture. At 600, the geographic locations of users are identified as part of a navigation system. At 602, estimated time-of-arrival (ETA) information of the users to a destination is computed as associated with navigation of the users to the destination along specific routes. At 604, current locations of the users, associated ETA information, and routes, are shared among the users for viewing by each of the users. At 606, interactive communications is enabled between the users via the navigation system. At 608, the ETA information of the users is updated in realtime during travel of the users to the destination.

Figure 7:
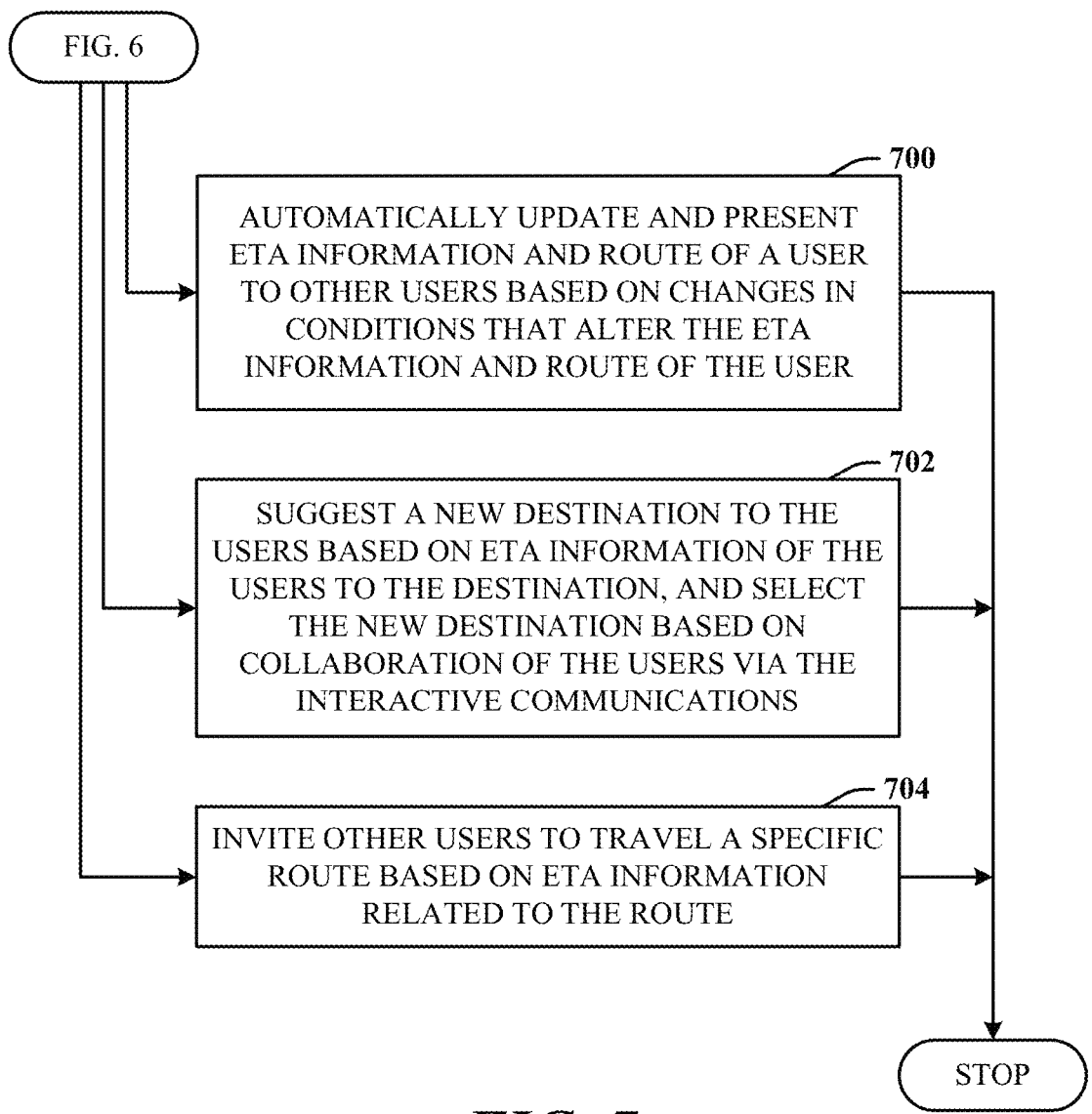
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, ETA information and route of a user are automatically updated and presented to other users based on changes in conditions that alter the ETA information and route of the user. At 702, a new destination is suggested to the users based on ETA information of the users to the destination, and the new destination is selected based on collaboration of the users via the interactive communications. At 704, other users are invited to travel a specific route based on ETA information related to the route.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
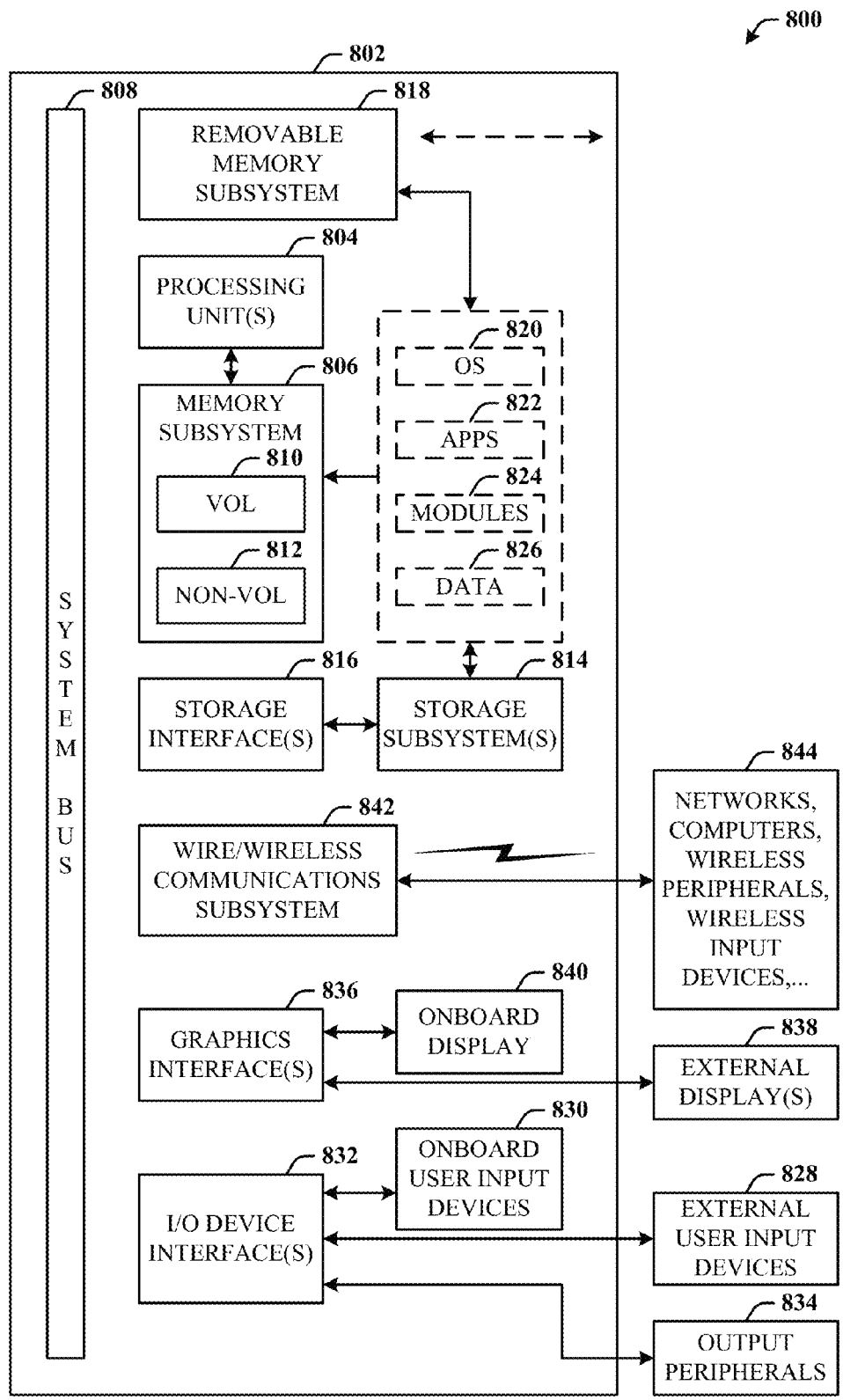
FIG. 8 illustrates a block diagram of a computing system that executes social and shared time-of-arrival estimated to a destination in accordance with the disclosed architecture.

Referring now to FIG. 8, there is illustrated a block diagram of a computing system 800 that executes social and shared time-of-arrival estimated to a destination in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include items and components of the system 100 of FIG. 1, items and components of the system 200 of FIG. 2, items and components of the interface 300 of FIG. 3, and the methods represented by the flowcharts of FIGS. 4-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

As previously indicated, the disclosed architecture applies as well to mobiles devices such as cell phones, portable mobile capable computing systems such as tablets, and so on.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a sharing component that enables sharing of geolocation information of entities relative to a destination and estimated time-of-arrival (ETA) information of the entities relative to the destination to identify routes of travel of the entities to the destination, the sharing enabled among the entities, the entities traveling to the destination, the geolocation information and ETA information updated automatically as entities travel to the destination;
   a decision component that enables dynamic decision-making among the entities as part of travel to the destination based on entity location at a given point in time and calculated routes to the destination; and
   a microprocessor that executes computer-executable instructions stored in a memory.

2. The system of claim 1, further comprising a decision component that enables dynamic decision-making among the entities as part of travel to the destination, based on entity location at a given point in time and type of destination defined by the entities.

3. The system of claim 1, wherein the sharing component interacts with a communications component to enable collaborative interactive communications between the entities associated with navigating to the destination and suggesting a new destination.

4. The system of claim 1, further comprising a suggestion component that suggests a new destination suitable to the entities.

5. The system of claim 1, wherein the destination is a predetermined specific destination for which the time-of-arrival of the group is estimated.

6. The system of claim 1, wherein the destination is a category of destination for which the time-of-arrival of the group is estimated.

7. The system of claim 1, wherein the sharing component enables an entity to invite another entity to take a same route to the destination.

8. The system of claim 1, further comprising a presentation component that enables visual presentation of an entity graphic representative of an entity, ETA information associated with the entity graphic, and destination.

9. A method, comprising acts of:
computing estimated time-of-arrival (ETA) information of users travelling from respective identified locations to a shared destination as associated with navigation of the users to the shared destination along specific routes;
sharing current locations of the users, associated ETA information, and routes, among the users for viewing by each of the users;
enabling interactive communications between the users via a navigation system;
updating the ETA information of the users in realtime during travel of the users to the shared destination; and
utilizing a microprocessor that executes instructions stored in memory to perform at least one of the acts.

10. The method of claim 9, further comprising automatically updating and presenting ETA information and route of a user to other users based on changes in conditions that alter the ETA information and route of the user.

11. The method of claim 9, further comprising suggesting a new destination to the users based on ETA information of the users to the destination, and selecting the new destination based on collaboration of the users via the interactive communications.

12. The method of claim 9, further comprising inviting other users to travel a specific route based on ETA information related to the route.

13. One or more memory devices storing processing instructions that, when executed, cause one or more processing devices to perform a method, comprising:
computing estimated time-of-arrival (ETA) information of users travelling from respective identified locations to a destination as associated with navigation of the users to the shared destination along specific routes;
sharing current locations of the users, associated ETA information, and routes, among the users for viewing by each of the users;
enabling interactive communications between the users via the navigation system; and
updating the ETA information of the users in realtime during travel of the users to the shared destination.

* * * * *